United States Patent
Nara et al.

(10) Patent No.: US 7,352,665 B2
(45) Date of Patent: Apr. 1, 2008

(54) TRACKING GAIN CONTROL METHOD AND TRACKING CONTROL CIRCUIT

(75) Inventors: Masaaki Nara, Ora-gun (JP); Michihiro Kuraoka, Ora-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 545 days.

(21) Appl. No.: 10/987,829

(22) Filed: Nov. 12, 2004

(65) Prior Publication Data

US 2005/0105411 A1 May 19, 2005

(30) Foreign Application Priority Data

Nov. 19, 2003 (JP) ............................. 2003-389833

(51) Int. Cl.
*G11B 7/00* (2006.01)
(52) U.S. Cl. .................................. 369/44.29
(58) Field of Classification Search .......... 369/44.27, 369/44.28, 44.29, 44.34, 44.35, 44.32, 44.26
See application file for complete search history.

(56) References Cited

U.S. PATENT DOCUMENTS 5,610,887 A 3/1997 Arai et al.
7,158,453 B2 * 1/2007 Sameshima .............. 369/44.32

FOREIGN PATENT DOCUMENTS

EP 0 654 785 A1 5/1995
JP 7-147023 6/1995

OTHER PUBLICATIONS

English Patent Abstract of 7-147023 from esp@cenet 1995.

* cited by examiner

*Primary Examiner*—Nabil Hindi
(74) *Attorney, Agent, or Firm*—Osha Liang LLP

(57) ABSTRACT

A tracking signal circuit in an optical disc playback apparatus for performing tracking servo control in accordance with a tracking error signal generated from a first signal that is input from a first photodetector circuit and a second signal that is input from a second photodetector circuit comprises a tracking signal amplifier circuit that has variable gain and a gain control circuit for controlling the gain of the tracking signal amplifier circuit. The tracking gain control circuit comprises a peak hold circuit for performing a peak hold operation on the amplitude of the tracking error signal in a state where tracking servo control is not performed and an amplitude comparator circuit for comparing the amplitude that was held by the peak hold operation with a predetermined reference amplitude, and controls the gain in accordance with the amplitude comparison result. As a result, the tracking gain can be appropriately set for optical discs with each having a different reflectivity.

5 Claims, 5 Drawing Sheets

TRACKING GAIN CONTROL METHOD AND TRACKING CONTROL CIRCUIT

CROSS-REFERENCE TO RELATED APPLICATIONS

The Japanese priority applications Number 2003-389833 upon which this patent application is based are hereby incorporated by reference.

BACKGROUND OF THE INVENTION

1. Field of the Invention

The present invention relates to a tracking gain control method, and more particularly a tracking gain control method for an optical pickup for reading the signals on optical discs from a plurality of standards with each having a different reflectivity.

2. Description of the Related Art

In an optical disc apparatus for recording information onto and reading information from optical discs, the optical pickup scans the track on an optical disc with laser light. A tracking servo control is performed at the optical pickup so that the laser light follows the track on the optical disc rotating at high speed. The tracking servo control is performed on the basis of a tracking error signal that indicates the amount of deviation of the laser light from the track. The tracking error signal is output by an optical sensor for detecting the reflected light from the optical disc.

Generally, the servo loop gain of the tracking servo control performs control operations to track the amplification gain of a voltage control amplifier (VCA) that is provided with an automatic gain control circuit (AGC) for maintaining a constant intensity of the light intensity signal (RF signal). Therefore, when the light intensity signal is small, the tracking gain is raised, and when the light intensity signal is large, the tracking gain is lowered.

For example, for optical discs having a diameter of 130 mm (5.25 inches) and a common track pitch (recording track spacing) and minimum pit length (minimum length of a recording pit), various standards are available besides CD, such as CD-R, CR-RW, and so forth. Since these optical discs use different materials for their reflecting film, in comparison to the 70% or higher reflectivity of the laser light for the CD standard, it is 65% or higher for CD-R media and approximately 20% for CD-RW media.

If a single optical pickup is used to read signals from optical discs having different standards, the tracking gain increases since the light intensity signal decreases for optical discs having a lower reflectivity than that of CD media, such as CD-R, CD-RW, and so forth. When the tracking gain increases excessively, one problem is that the tracking servo loop circuit may become unstable during a track jump operation thereby impairing playability.

SUMMARY OF THE INVENTION

An advantage of the present invention is that the tracking gain is appropriately controlled in the tracking servo loop so that the track can be followed in a stable manner on optical discs from a plurality of standards with each having a different reflectivity.

The tracking gain control method of the present invention is a method in an optical pickup for performing tracking servo control in accordance with a tracking error signal generated from a first signal that is input from a first photodetector and a second signal that is input from a second photodetector, where the method comprises a balance adjustment step for adjusting the balance between the first signal and the second signal in a state where tracking servo control is not performed, and a gain setting step for setting the tracking gain on the basis of the amplitude of the tracking error signal during the balance adjustment step.

According to the method in the present invention, an appropriate tracking gain can even be set for an optical disc with low reflectivity by setting the tracking gain on the basis of the signal intensity itself that is detected by photodetectors for the purpose of detecting the tracking signal error. For example, if the amplitude of the tracking error signal is greater than or equal to a predetermined value, the tracking gain is set small.

Furthermore, in another aspect of the present invention, the gain setting step includes a peak hold step for performing a peak hold operation on an amplitude of the tracking error signal and an amplitude comparison step for comparing the amplitude that was held in the peak hold operation with a predetermined reference amplitude, and sets the tracking gain in accordance with the amplitude comparison result in the amplitude comparison step.

According to the method of the present invention, a stable setting can be promptly performed by performing the peak hold operation on the amplitude of the tracking error signal and comparing the amplitude that was held by the peak hold operation with the predetermined reference amplitude.

The tracking control circuit of the present invention in the optical pickup for performing tracking servo control in accordance with the tracking error signal generated from the first signal that is input from the first photodetector and the second signal that is input from the second photodetector, comprises a gain control circuit for adjusting the tracking servo gain. The gain control circuit comprises a peak hold circuit for performing the peak hold operation on the amplitude of the tracking error signal in a state where tracking servo control is not performed and an amplitude comparator circuit for comparing the amplitude that was held by the peak hold operation with the predetermined reference value, and controls the gain in accordance with the amplitude comparison result in the amplitude comparator circuit.

Furthermore, in another aspect of the present invention, the gain control circuit comprises a tracking signal amplifier circuit that has variable gain and controls the amplification factor of the tracking signal amplifier circuit.

Moreover, in another aspect of the present invention, the tracking signal amplifier circuit comprises a gain reduction circuit for lowering the gain compared to the gain setting based on the light intensity signal. The gain control circuit activates the gain reduction circuit when the amplitude that was held by the peak hold operation in the amplitude comparator circuit is larger than the predetermined reference amplitude.

According to the configuration of the present invention, the tracking gain can be set in accordance with the light intensity signal so as not to exceed a predetermined value.

According to the present invention, an optical disc playback apparatus can be provided so as to perform stable tracking with respect to optical discs having differences in their reflectivity by setting the tracking gain on the basis of the amplitude of the tracking error signal in a state where tracking servo control is not performed.

DETAILED DESCRIPTION OF THE PREFERRED EMBODIMENTS

A preferred embodiment of the present invention will be described hereinafter with reference to the attached drawings.

Figure 1:
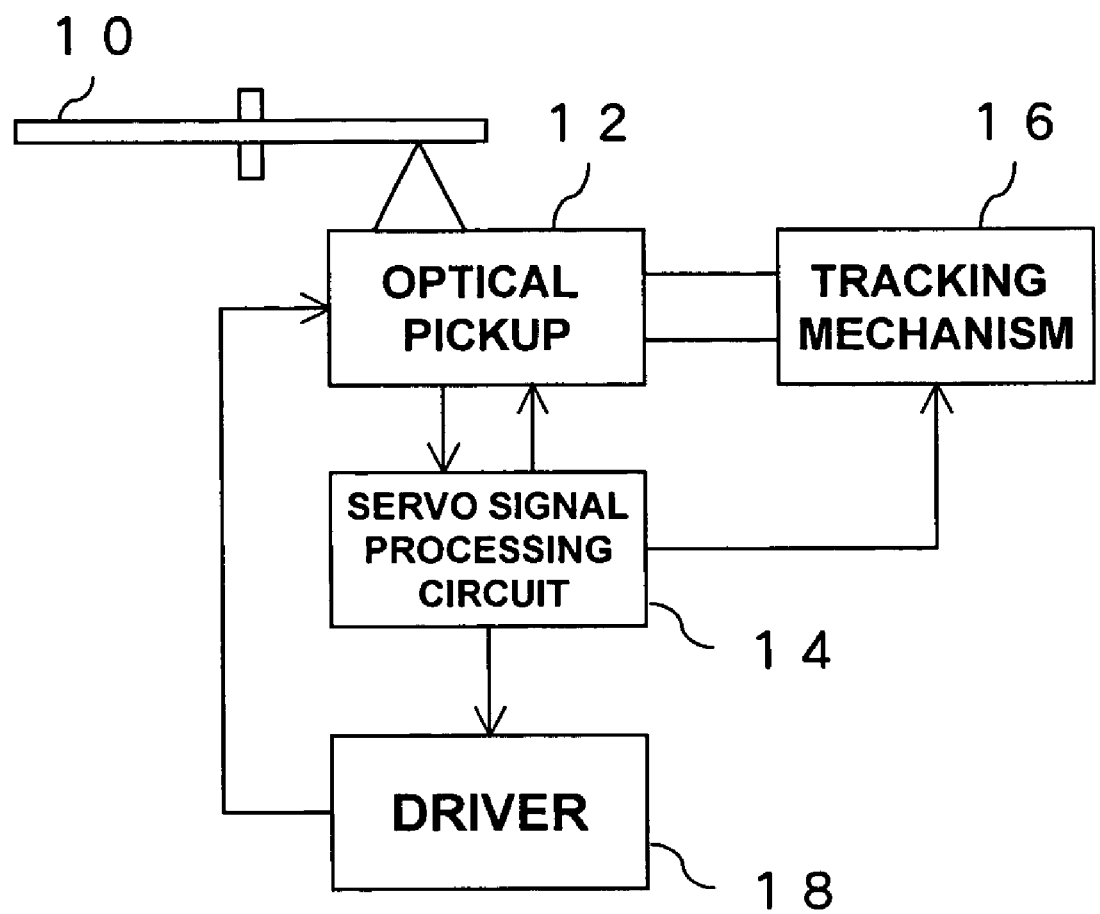
FIG. 1 is a block diagram showing a configuration of an optical disc apparatus provided with a tracking signal circuit relating to an embodiment of the present invention.

FIG. 1 is a block diagram showing a configuration of an optical disc apparatus provided with a tracking signal circuit relating to an embodiment of the present invention. It should be noted that any configuration unrelated to the tracking mechanism has been omitted. An optical pickup 12 emits a laser light onto an optical disc 10 rotating at high speed, and the optical pickup 12 detects the reflected light. The optical pickup 12 aims, onto a sequence of pits on the optical disc, a main spot for reading information signals and two side spots for detecting track position. The main spot detects the intensity of the reflected light with a photodetector divided into four parts, and the sum of the signals detected by the photodetector divided into four parts becomes a light intensity signal (RF signal). At the same time, each reflected light from the two side spots is respectively detected by a first photodetector and a second photodetector and respectively output as a first signal and a second signal so that a tracking error signal (TE signal) is generated by a head amplifier within the optical pickup 12.

The light intensity signal and the tracking error signal are input by an analog signal processing IC provided with a servo signal processing circuit 14. The servo signal processing circuit 14 comprises a tracking servo circuit that is controlled to a predetermined gain. The servo loop of this tracking servo circuit is formed by a tracking mechanism 16 and the optical pickup 12. Furthermore, to a laser driver 18 for controlling the laser light is supplied a laser light control signal from the servo signal processing circuit 14.

Although the three-spot configuration was adopted in this embodiment for the tracking signal detection method, a diffracted light differential configuration or a wobbling configuration may be adopted. Furthermore, although the servo signal processing circuit 14 was provided in the analog signal processing IC, it may be configured in a digital signal processor.

The gain of the tracking servo loop is determined by the amplification factor of a voltage control amplifier (VCA) for amplifying the tracking error signal in the servo signal processing circuit 14. The setting of the gain is performed at the initial setting operation prior to the playback of the optical disc signals. Furthermore, the initial setting operation includes a balance adjustment of the first and second signals for generating the tracking error signal.

Figure 2:
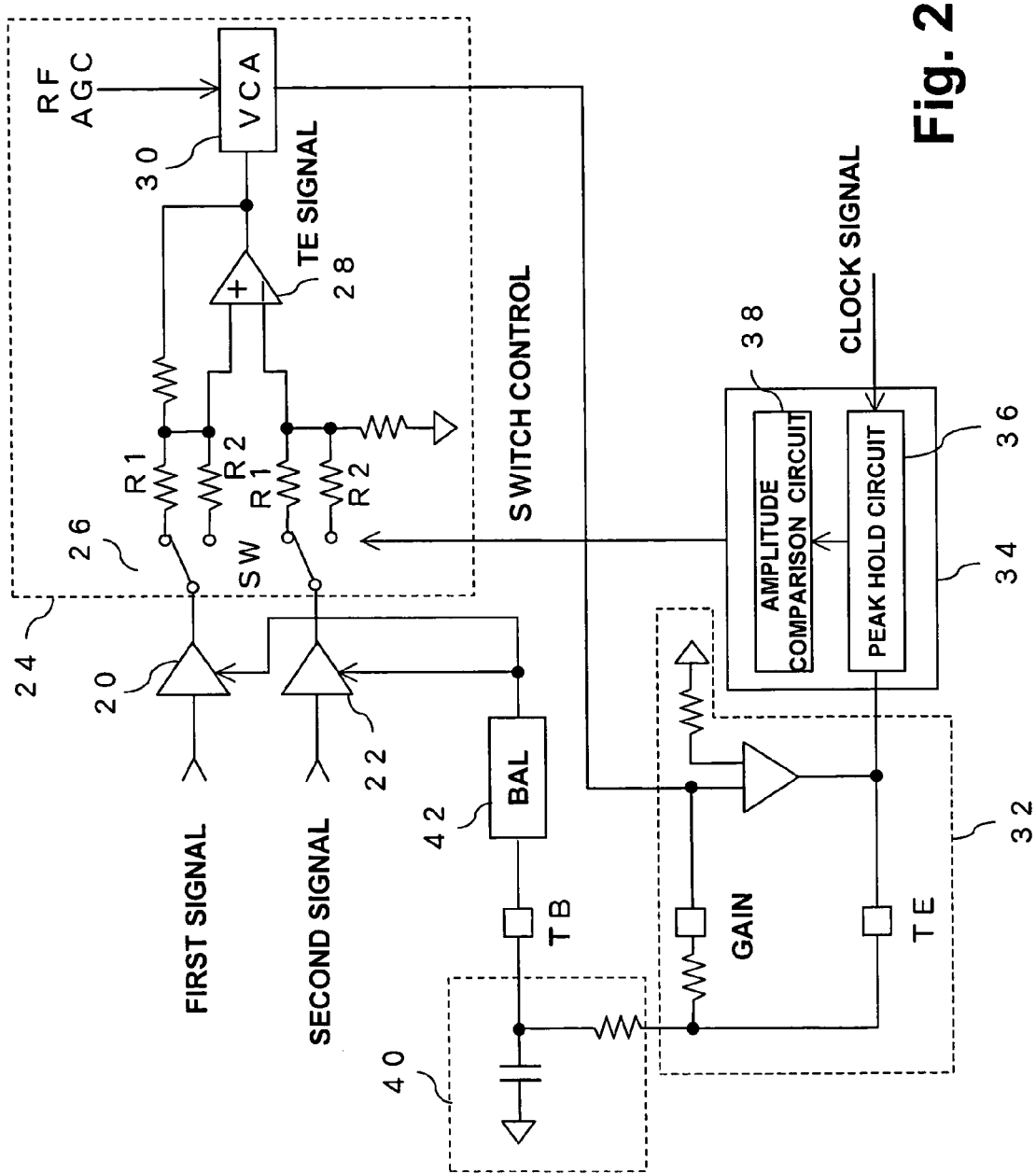
FIG. 2 shows one example of a tracking signal circuit relating to an embodiment of the present invention.

FIG. 2 shows one example of a tracking signal circuit relating to an embodiment of the present invention. A first signal VCA 20 amplifies the first signal from the first photodetector for detecting the reflected light from one side spot for track position detection, and a second signal VCA 22 amplifies the second signal from the second photodetector for detecting the reflected light from the other side spot. An output signal (E) of the first signal VCA 20 and an output signal (F) of the second signal VCA 22 are input by a tracking signal amplifier circuit 24.

The tracking signal amplifier circuit 24 comprises a switch 26 for selecting either R1 or R2 for the input resistance for a TE signal generator (subtracter) 28, the TE signal generator (subtracter) 28 for generating the TE signal from the E and F signals, and a TE signal amplifier 30, which is a VCA. Assuming R1>R2 and the switch 26 is connected to R1, the gain of the TE signal generator (subtracter) 28 is smaller than when the switch 26 is connected to R2. Therefore, the circuit that is connected to resistance R1 functions as a tracking gain reduction circuit.

An output signal of the TE signal generator (subtracter) 28 is input by the TE signal amplifier 30. To the TE signal amplifier 30 is input a signal in accordance with the amplification gain of the VCA provided with an AGC circuit for the RF signal. The TE signal amplifier 30 amplifies the TE signal at a gain in accordance with the amplification gain of the VCA provided with an AGC circuit for the RF signal. Furthermore, the output signal of the TE signal amplifier 30 is input by an amplifier 32. An output of the amplifier 32 is input by a tracking gain control circuit 34.

The tracking gain control circuit 34 comprises a peak hold circuit 36 for performing a peak hold operation on the amplitude of the TE signal and an amplitude comparator circuit 38. To the peak hold circuit 36 is input a clock signal and the peak hold operation is performed during a period determined by the clock signal. The amplitude comparator circuit 38, to which has been stored in advance a reference amplitude, compares a peak amplitude value held in the peak hold circuit 36 with the reference amplitude. When the amplitude comparator circuit 38 judges that the peak amplitude value of the TE signal is larger than the reference amplitude, the tracking gain control circuit 34 sends a control signal to the switch 26 so as to connect to the terminals for input resistance R1. On the basis of the control signal, the switch 26 is switched so that the first signal and the second signal are connected to the circuits with input resistance R1 so as to lower the tracking gain below the gain in accordance with the amplification gain of the VCA that is provided with the AGC circuit for the RF signal. On the other hand, when the amplitude comparator circuit 38 judges that the peak amplitude value of the TE signal is larger than the reference amplitude, the tracking gain control circuit 34 sends a control signal to the switch 26 so as to connect to the terminals for input resistance R2. On the basis of the control signal, the switch 26 is switched so that the first signal and the second signal are connected to the circuits with input resistance R2 so as to set the tracking gain in accordance with the amplification gain of the VCA that is provided with the AGC circuit for the RF signal.

The TE signal that has its gain controlled as described hereinabove is supplied to the tracking mechanism 16 from the TE signal terminal.

According to this configuration, even in the case where the reflectivity of the optical disc is low and the gain of the VCA that is provided with the AGC circuit for the RF signal is set high, the tracking gain follows it and does not become excessively high. On the other hand, in the case where the reflectivity of the optical disc is high, the tracking gain is set to follow the gain of the VCA that is provided with the AGC circuit for the RF signal in the same manner as in the prior art so that it can be set to a preferable tracking gain.

Furthermore, the output signal of the amplifier 32 is input by an RC integrating circuit 40 and integrated, and the high frequency components are removed from the TE signal to generate a TB signal. The TB signal is input by a balance adjustment circuit 42. In the balance adjustment step, the balance adjustment circuit 42 adjusts the gain of the first signal VCA 20 and the second signal VCA 22 so as to remove the balance component in the TE signal in accordance with the TB signal.

Figure 3:
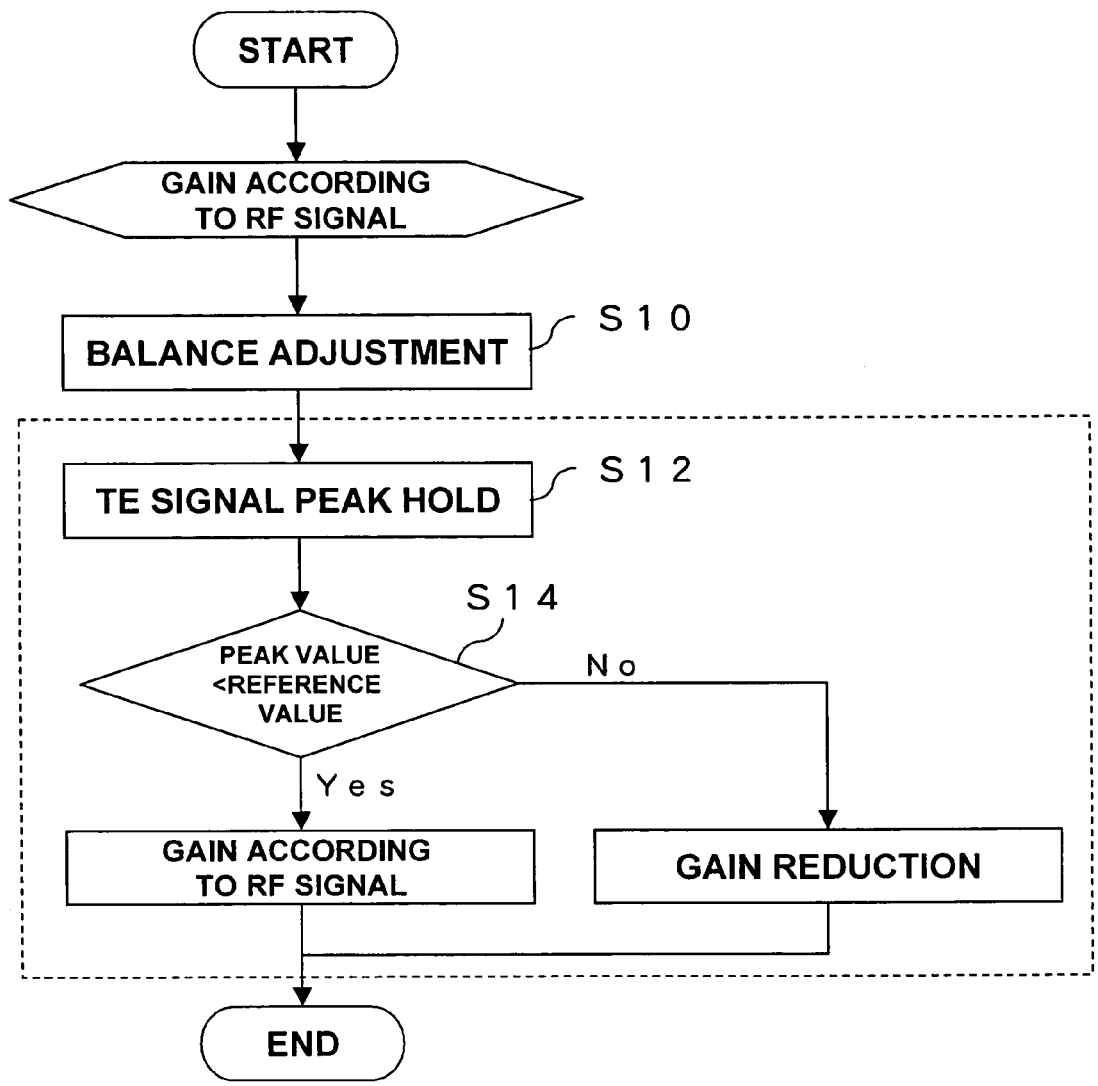
FIG. 3 is a flowchart showing the flow of a gain setting in a tracking gain control circuit.

FIG. 3 is a flowchart showing the flow of a gain setting in the tracking gain control circuit 34. First, the tracking gain is set according to the amplification gain of the VCA that is provided with the AGC circuit for the RF signal. Next, the balance adjustment circuit 42 performs balance adjustment (S10) between the first signal and the second signal in a state where the tracking servo is not applied. The peak hold circuit 36 performs a peak hold operation (S12) for the TE signal that is undergoing balance adjustment. Next, the amplitude comparator circuit 38 compares (S14) the amplitude value that was held by the peak hold operation with the reference value. The tracking gain control circuit 34 sets the tracking gain in accordance with the amplification gain of the VCA that is provided with the AGC circuit for the RF signal when the amplitude value that was held by the peak hold operation is not larger than the reference value, and sets the tracking gain lower than the gain in accordance with the amplification gain of the VCA that is provided with the AGC circuit for the RF signal.

Here, if the tracking signal amplifier circuit 24 is provided with a gain reduction circuit, the gain reduction circuit is activated when the TE signal amplitude value that was held by the peak hold operation is greater than or equal to the reference value. According to this configuration, the tracking gain can be set lower than the amplification gain of the VCA that is provided with the AGC circuit for the RF signal, thereby making it possible to prevent the gain from being set excessively high.

Figure 4:
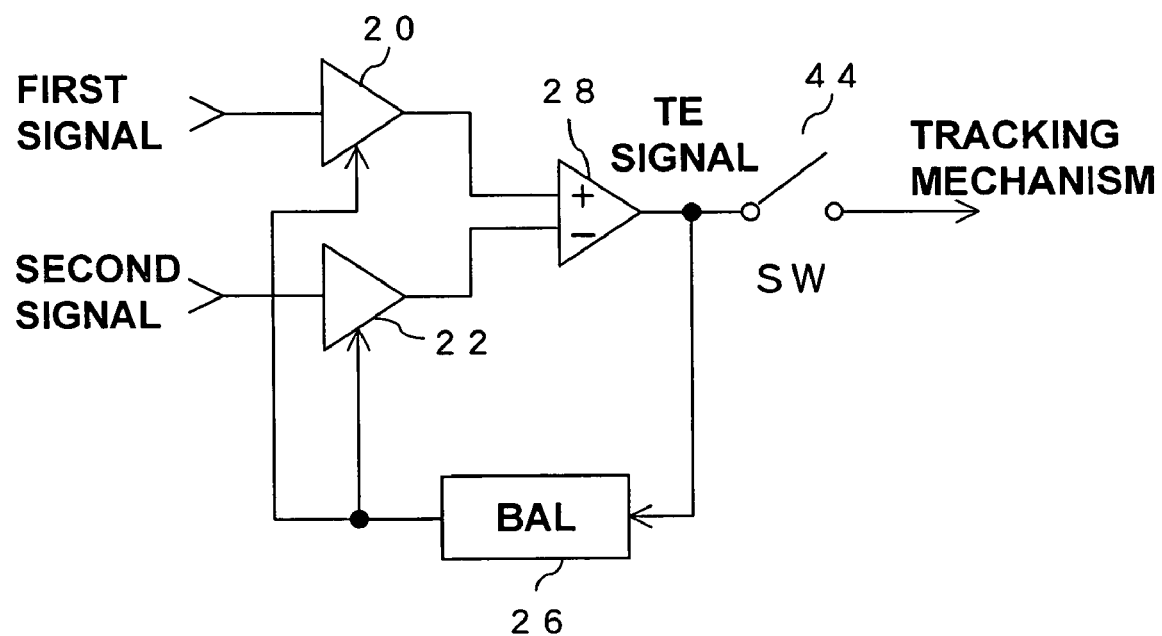
FIG. 4 shows a circuit block during balance adjustment in a servo signal processing circuit.

FIG. 4 shows a circuit block during balance adjustment in the servo signal processing circuit 14. A switch 44 is provided in the signal path from the output of the TE signal generator (subtracter) 28 to the tracking mechanism 16. The switch 44 is open in the balance adjustment step and the tracking gain setting step. Namely, the balance adjustment step and the tracking gain setting step are performed in a state where tracking servo control is not performed. In a state where tracking servo control is performed, the TE signal becomes small and the peak hold operation used to set the tracking gain cannot be performed at a satisfactory precision. By performing the peak hold operation that is used to set the tracking gain in a state where tracking servo control is not performed as described above, it is possible to set the tracking gain at a higher precision to correspond to the reflectivity of the optical disc.

Figure 5:
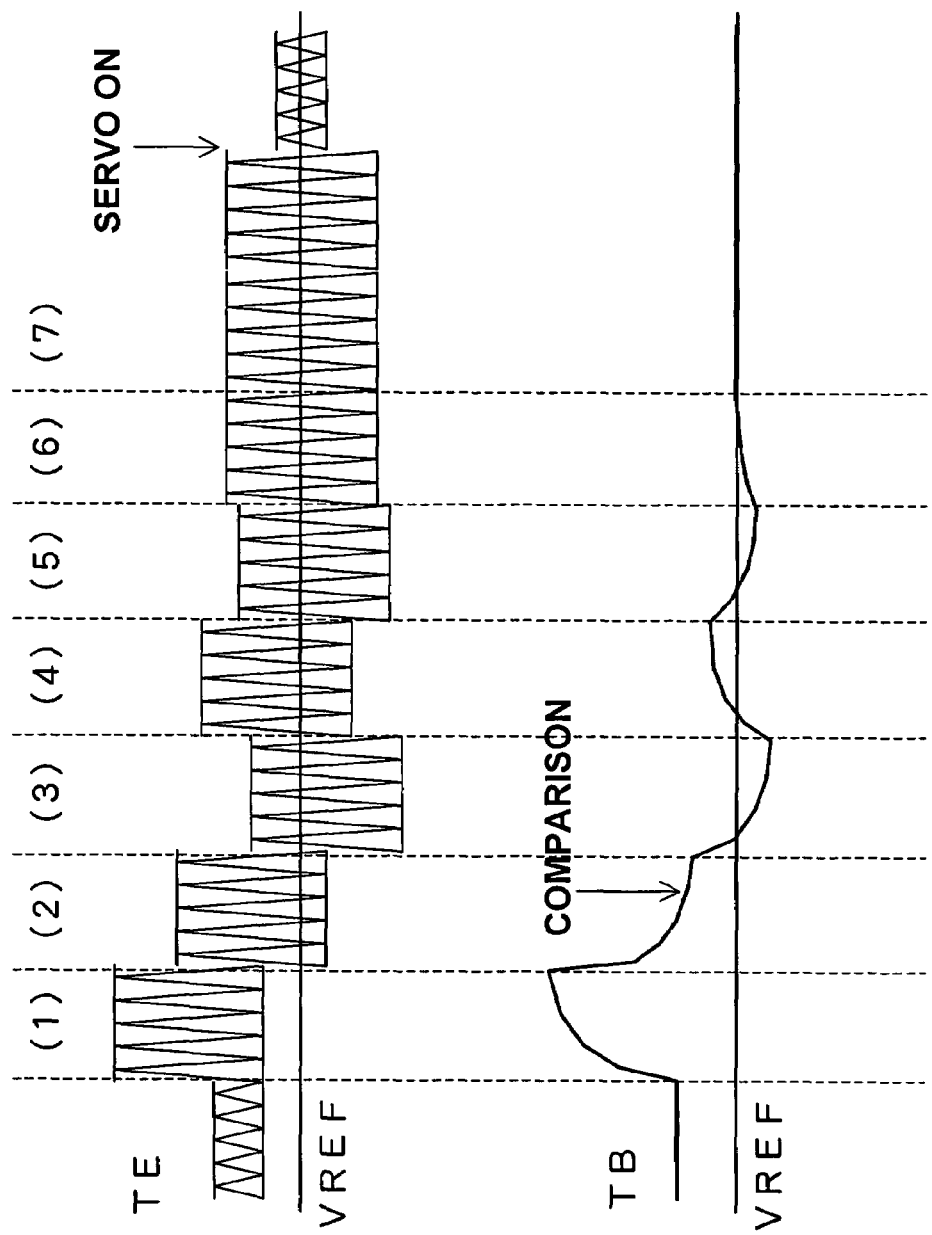
FIG. 5 shows one example of a time change during balance adjustment of the TE signal intensity with respect to reference voltage VREF, and TB with respect to VREF.

Next, the peak hold operation for the TE signal will be described using one specific example of the balance adjustment signal. A known balance adjustment is disclosed in Japanese Patent Laid-Open Publication No. Hei 7-147023. FIG. 5 shows one example of a time change during balance adjustment of the TE signal intensity with respect to reference voltage VREF, and TB with respect to VREF. In the balance adjustment circuit, after a 5-bit balance adjustment signal is sequentially sent and data is held by flip-flops, analog conversion is performed by a D/A converter and the signal is output. A balance adjustment signal of 00000 is input in the interval of (1) and the TB signal is compared with VREF at an elapsed point ¾ into the interval. In this case, the TB signal is larger than VREF. Next, a balance adjustment signal of 10000 is input in the interval of (2) and the TB signal is compared with VREF at an elapsed point ¾ into the interval. In this case, VREF is larger than the TB signal so that the first of the five bits becomes a "1". Although not shown here, the set value is held in flip-flops. Next, a balance adjustment signal of 11000 is input in the interval of (3) and the TB signal is compared with VREF at an elapsed point ¾ into the interval. In this case, the TB signal is smaller than VREF so that the second of the five bits becomes a "0". Next, a balance adjustment signal of 10100 is input in the interval of (4) and the TB signal is compared with VREF at an elapsed point ¾ into the interval. In this case, the TB signal is larger than VREF so that the third of the five bits becomes a "1". Next, a balance adjustment signal of 10110 is input in the interval of (5) and the TB signal is compared with VREF at an elapsed point ¾ into the interval. In this case, the TB signal is smaller than VREF so that the fourth of the five bits becomes a "0". Next, a balance signal of 10101 is input in the interval of (6) and the TB signal is compared with VREF at an elapsed point ¾ into the interval. In this case, the TB signal is smaller than VREF so that the fifth of the five bits becomes a "0". Finally, the balance adjustment signal of 10100 that was established in the interval of (7) is input. In this state, the TB signal is essentially "0", the balance adjustment ends, and the tracking servo turns on.

In the balance adjustment step as described above, the peak hold circuit 36 performs the peak hold operation on the amplitude of the TE signal at the input of the final balance adjustment signal that was established. The tracking gain is set on the basis of the peak hold amplitude value. Since the TE signal has an oscillatory waveform, the peak hold operation makes it possible to prevent an erroneous detection of values.

Furthermore, although the tracking signal amplifier circuit 24 adopted a two-stage gain adjustment in the embodiment of the present invention, a fine gain adjustment of three-stages or more may be adopted. Moreover, the tracking gain may be limited so as not to exceed a predetermined maximum value and may be clamped at that maximum value.

According to the present invention, an optical disc playback apparatus can be provided so as to perform stable tracking with respect to optical discs having differences in their reflectivity by setting the tracking gain on the basis of the amplitude of the tracking error signal in a state where tracking servo control is not performed.

Furthermore, according to the present invention, since the peak hold operation is performed on the amplitude of the tracking error signal and since the amplitude that was held by the peak hold operation is compared to a predetermined reference amplitude, a stable setting can be promptly performed so that an optical disc playback apparatus having high playability can be provided.

Furthermore, according to the present invention, since the tracking gain is prevented from rising to an excessive value by the selective activation of the gain reduction circuit, a low-cost optical disc playback apparatus can be provided that is capable of stable tracking with respect to a plurality of optical discs with each having a different reflectivity.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A tracking gain control method in an optical pickup for performing tracking servo control in accordance with a tracking error signal generated from a first signal that is input from a first photodetector and a second signal that is input from a second photodetector, the method comprising:
   a balance adjustment step for adjusting the balance between said first signal and said second signal in a state where said tracking servo control is not performed; and a gain setting step for setting said tracking gain on the basis of an amplitude of said tracking error signal during said balance adjustment step.

2. A tracking gain control method in an optical pickup for performing tracking servo control in accordance with a tracking error signal generated from a first signal that is input from a first photodetector and a second signal that is input from a second photodetector, the method comprising:
   a balance adjustment step for adjusting the balance between said first signal and said second signal in a state where said tracking servo control is not performed; and a gain setting step for setting said tracking gain on the basis of an amplitude of said tracking error signal during said balance adjustment step
   wherein said gain setting step comprises: a peak hold step for performing a peak hold operation on the amplitude of said tracking error signal; and an amplitude comparison step for comparing the amplitude that was held in said peak hold step with a predetermined reference amplitude; said tracking gain is set in accordance with an amplitude comparison result in said amplitude comparison step.

3. A tracking control circuit in an optical pickup for performing tracking servo control in accordance with a tracking error signal generated from a first signal that is input from a first photodetector and a second signal that is input from a second photodetector, comprising:
   a gain control circuit for adjusting a tracking servo loop gain; wherein said gain control circuit has a peak hold circuit for performing a peak hold operation on an amplitude of said tracking error signal in a state where said tracking servo control is not performed;
   an amplitude comparator circuit for comparing the amplitude that was held by said peak hold operation with a predetermined reference amplitude; and controls said gain in accordance with an amplitude comparison result in said amplitude comparator circuit.

4. The tracking control circuit according to claim 3, wherein: said gain control circuit comprises a tracking signal amplifier circuit that has variable gain; said gain control circuit controls the amplification factor of said tracking signal amplifier circuit.

5. The tracking control circuit according to claim 4, wherein: said tracking signal amplifier circuit comprises a gain reduction circuit for lowering the gain compared to the gain setting based on a light intensity signal for reflected light from an optical disc; said gain control circuit activates said gain reduction circuit if the amplitude that was held by the peak hold operation is larger than a predetermined reference amplitude in said amplitude comparator circuit.

* * * * *